US007400465B2

(12) United States Patent
Abe (10) Patent No.: US 7,400,465 B2
(45) Date of Patent: Jul. 15, 2008

(54) RECORDING MEDIUM CARTRIDGE AND RECORDING/REPRODUCING APPARATUS THEREFOR

(75) Inventor: Naoto Abe, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 875 days.

(21) Appl. No.: 10/638,332

(22) Filed: Aug. 12, 2003

(65) Prior Publication Data

US 2004/0101275 A1    May 27, 2004

(30) Foreign Application Priority Data

Aug. 22, 2002    (JP)    ............................. 2002-242112

(51) Int. Cl.
G11B 19/02    (2006.01)
G11B 15/04    (2006.01)
G11B 19/04    (2006.01)

(52) U.S. Cl. ...................... 360/69; 360/60; 369/53.21; 369/59.23; 380/201

(58) Field of Classification Search .................. None
See application file for complete search history.

(56) References Cited

U.S. PATENT DOCUMENTS 5,754,648 A  *  5/1998  Ryan et al. ................. 380/201
6,567,610 B2    5/2003  Ando et al.
2001/0024337 A1*  9/2001  Thomas et al. ............. 360/60
2003/0067701 A1*  4/2003  Christie, Jr. ............... 360/60

FOREIGN PATENT DOCUMENTS

| JP | 64-048550 | 2/1989 |
| JP | 06-131806 | 5/1994 |
| JP | 08-124319 | 5/1996 |
| JP | 2001-332064 A | 11/2001 |
| JP | 2002-142193 | 5/2002 |

* cited by examiner

Primary Examiner—Andrew L. Sniezek
(74) Attorney, Agent, or Firm—Sughrue Mion, PLLC (57) ABSTRACT

The present invention relates to a recording medium cartridge memory and recording/reproducing apparatus. A recording medium cartridge consists of a recording medium and a cartridge memory in which a unique ID of the apparatus used for recording/reproducing the cartridge memory is recorded in an unrewritable condition. The apparatus for recording/reproducing the recording cartridge memory consists of a sending/receiving unit which reads out an ID recorded in the cartridge memory, an ID inspection unit inspecting whether or not the ID recorded in the cartridge memory and an ID stored in the apparatus accord by comparing both, and a control unit which records data in a recording medium or control operations of a recording/reproducing unit which reproduces data from the recording medium based on an inspection result in the ID inspection unit.

16 Claims, 7 Drawing Sheets

FIG.5A  (In Recording)

FIG.5B  (In Reproducing)

RECORDING MEDIUM CARTRIDGE AND RECORDING/REPRODUCING APPARATUS THEREFOR

FIELD OF THE INVENTION

The present invention relates to a recording medium cartridge and recording/reproducing apparatus consisting of a recording medium and cartridge memory, in particular, to the recording medium cartridge and recording/reproducing apparatus which can prevent leakage of data or determine data authenticity recorded in the recording medium.

BACKGROUND OF THE INVENTION

A recording medium cartridge consisting of a recording medium such as a magnetic tape is equipped with a cartridge memory to memorize manufacture information such as a manufacturer and manufacture number and usage history information such as a user and usage date. As a conventional recording medium cartridge consisting of a recording medium such as a magnetic tape, there exists such a recording medium cartridge disclosed in page 2, FIGS. 7 and 8 of Japan patent laid open publication 2001-332064. This kind of cartridge memory can give and receive a signal and electric power without contacting outside of the recording medium due to an electromagnetic induction, so it is housed inside a cartridge case of the recording medium cartridge.

In the conventional recording medium cartridge, there existed a problem that data written in a recording medium was leaked because of it being easily read out.

Moreover, the conventional recording medium cartridge can repeat data recording as many times as needed, so it was difficult to verify data authenticity recorded in the recording medium, that is, whether or not the data was tampered. Especially in the fields of a medical care and law, a method for determining the data authenticity was required from the necessity of assuring its authenticity.

SUMMARY OF THE INVENTION

The object of the invention is to provide a recording medium cartridge and recording/reproducing apparatus therefor which can prevent the leakage of data recorded in a recording medium. Moreover, another object of the invention is to provide the apparatus which can determine data authenticity recorded in the recording medium.

The recording medium cartridge related to the invention is characterized by being a cartridge consisting of a recording medium and cartridge memory, and a unique ID of the recording/reproducing apparatus used for recording/reproducing the recording medium cartridge being recorded in an unrewritable condition in the cartridge memory.

The recording medium cartridge related to the invention makes the recording/reproducing apparatus unique ID used for recording/reproducing the recording medium cartridge recorded in an unrewritable condition in the cartridge memory included in the recording medium cartridge. Then, composing the recording medium cartridge so as to be recorded/reproduced only in the case that an ID recorded in a cartridge memory accords with an ID stored in the apparatus enables the leakage of data recorded in the recording medium to be prevented because the recording medium cartridge can be recorded/reproduced by a specific recording/reproducing apparatus.

The apparatus related to the invention for recording/reproducing the recording medium cartridge is characterized by the apparatus having a unique key; in which when recording, the apparatus records first information produced by the key in the recording medium of the recording medium cartridge; and in which when reproducing, the apparatus compares the first information recorded in the recording medium with the second information produced by the key from data recorded in the recording medium, thereby the apparatus being composed so as to inspect whether or not both accord.

The recording media cartridge related to the invention enables data tampering existence or not to be known comparing the first information recorded in the recording medium with the second information produced by the key from data recorded in the recording medium, thereby inspecting whether or not both accord. That is, the data authenticity recorded in the recording medium can be judged. Concretely, if both accord, it is determined that the data recorded in the recording medium is not tampered, and if both do not accord, it is judged that the data recorded in the recording medium is tampered.

The apparatus related to the invention for recording/reproducing the recording medium cartridge is characterized in that the apparatus consists of a CRC code producing unit, a recording/reproducing unit, and a CRC code inspection unit, thereby the data authenticity recorded in the recording medium being composed so as to be determined based on an inspection result of the CRC code inspection unit. The CRC code producing unit which produces a first CRC code from first data for inspection made by coupling input data input from outside and the unique key stored in the apparatus in recording and produces a second CRC code made from second data for inspection by coupling data read out from the recording medium and key in reproducing. The recording/reproducing unit writes the input data and first CRC code in a recording medium in recording and reads out data recorded in the recording medium and the first CRC code in reproducing. The CRC code inspection unit compares the first CRC code with the second CRC code, thereby inspecting whether or not both accord in reproducing.

The recording medium cartridge related to the present invention enables data tampering existence or not to be known comparing the first CRC code produced from the first data for inspection with the second CRC code produced from the second data for inspection made by coupling data read out of the recording medium and key in reproducing through the CRC code inspection unit, thereby inspecting whether or not both accord. That is, the data authenticity recorded in the recording medium can be determined. Concretely, if both accord, it is judged that the data recorded in the recording medium is not tampered, and if both do not accord, it is judged that the data recorded in the recording medium is tampered.

Here, a "CRC code" is a computation result obtained by so called a Cyclic Redundancy Check. Concretely, after dividing data into some, an odd is derived by dividing one of divided data by a polynominal; next data added a resultant odd is again divided by the polynominal, thus sequentially repeating the procedure; and an eventual odd becomes the CRC code.

DESCRIPTION OF THE PREFERRED EMBODIMENTS

One of the embodiments related to the invention is described in detail hereinafter referring to drawings as needed. Meanwhile, the embodiment assumes a case in which the invention is applied to a magnetic tape cartridge.

Figure 1:
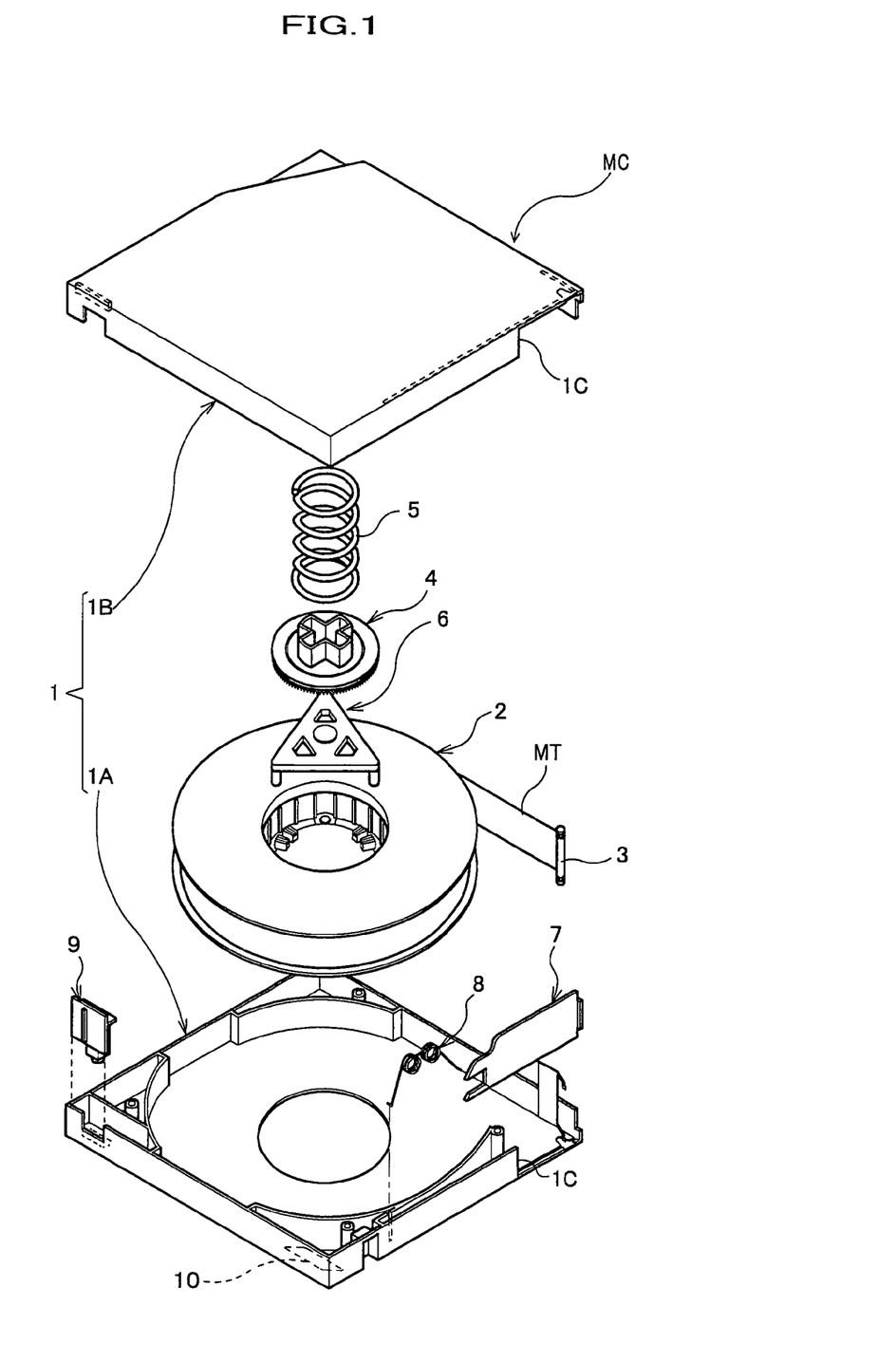
FIG. 1 is an exploded perspective view showing a configuration of a magnetic tape cartridge MC related to the embodiment.
Figure 2:
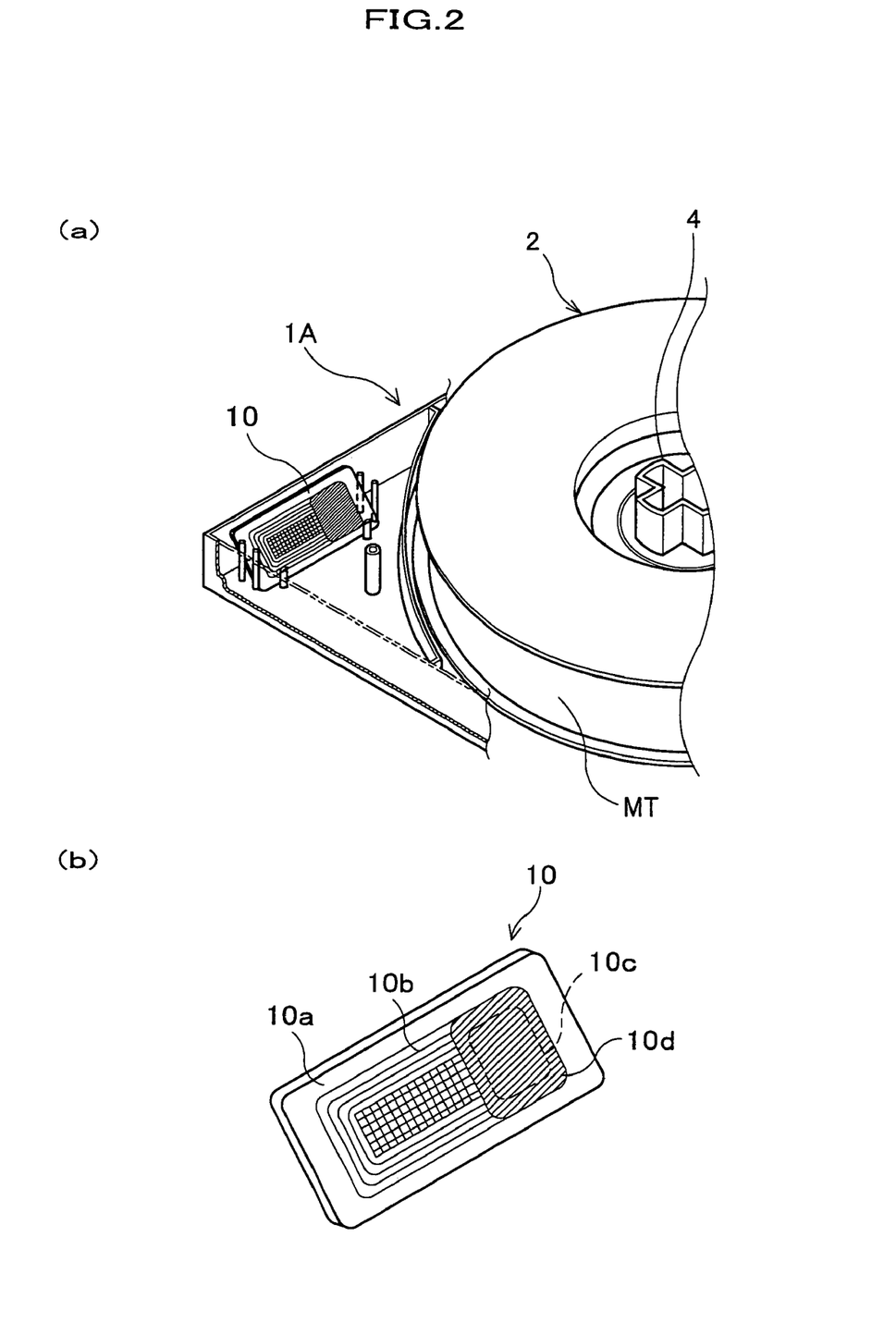
FIG. 2A is a perspective view showing a situation in which a cartridge memory 10 is attached to a lower half 1A of a case 1 and FIG. 2B is a perspective view showing an appearance of the cartridge memory 10.

Firstly, a mechanism of the magnetic tape cartridge related to the invention is described referring to FIGS. 1 and 2.

As shown in FIG. 1, the magnetic tape cartridge MC is composed of a single reel 2 in which a magnetic tape MT which is a recording medium is wound, a leader pin 3 to pull out the magnetic tape MT from a cartridge case 1, a lock plate 4 and compressing spring 5 to lock the rotation of a reel 2, a release pad 6 to unlock the reel 2, a slide door 7 to open/close a magnetic tape pulling-out port 1C formed over a lower half 1A and upper half 1B, a coiled spring 8 energizing the slide door 7 to a closing position of the magnetic tape pulling-out port 1C, a prevention claw 9 for an involuntary delete, a cartridge memory 10, and the like built in the cartridge case 1 which is divided into the lower half 1A and upper half 1B. Meanwhile, the cartridge memory 10 is arranged at a corner of the lower half 1A of the cartridge case 1 not to impede a travel of the magnetic tape MT (see FIG. 2A).

As shown in FIG. 2B, the cartridge memory 10 is formed as a rectangular sheet, and a loop antenna 10b and IC chip 10c are provided on a board 10a made of resin. The IC chip 10c is protected by being sealed in a globe top 10d which is a sealant made of resin. The IC chip 10c is electrically connected with the loop antenna 10b which is print-wired on the board 10a and data is sent/received between the chip 10c and a data sending/receiving unit 24 by propagating electromagnetic waves to the loop antenna 10b from the unit 24 of the apparatus 20 described later. A power source to drive the IC chip 10c is also supplied from the unit 24 by propagating the electromagnetic waves.

In the cartridge memory 10, manufacture information of the magnetic tape cartridge MC such as a manufacture and manufacture number, usage history information of the magnetic tape cartridge MC such as a user and usage date, and the like are recorded.

Moreover, in the cartridge memory 10, a unique ID of the apparatus 20 described later is recorded in order to prevent the leakage of data recorded in the magnetic tape MT. Meanwhile, the ID is recorded so as not to be rewritable afterward.

As described above, by composing the apparatus 20 so as to record/reproduce the magnetic tape cartridge MC with making the cartridge memory 10 record the unique ID of the apparatus 20 only if an ID recorded in the cartridge memory 10 and an ID stored in the apparatus 20 accord, the magnetic tape cartridge MC can be recorded/reproduced only by the specific apparatus 20, so the leakage of the data recorded in the magnetic tape MT contained in the magnetic cartridge MC can be prevented.

Figure 3:
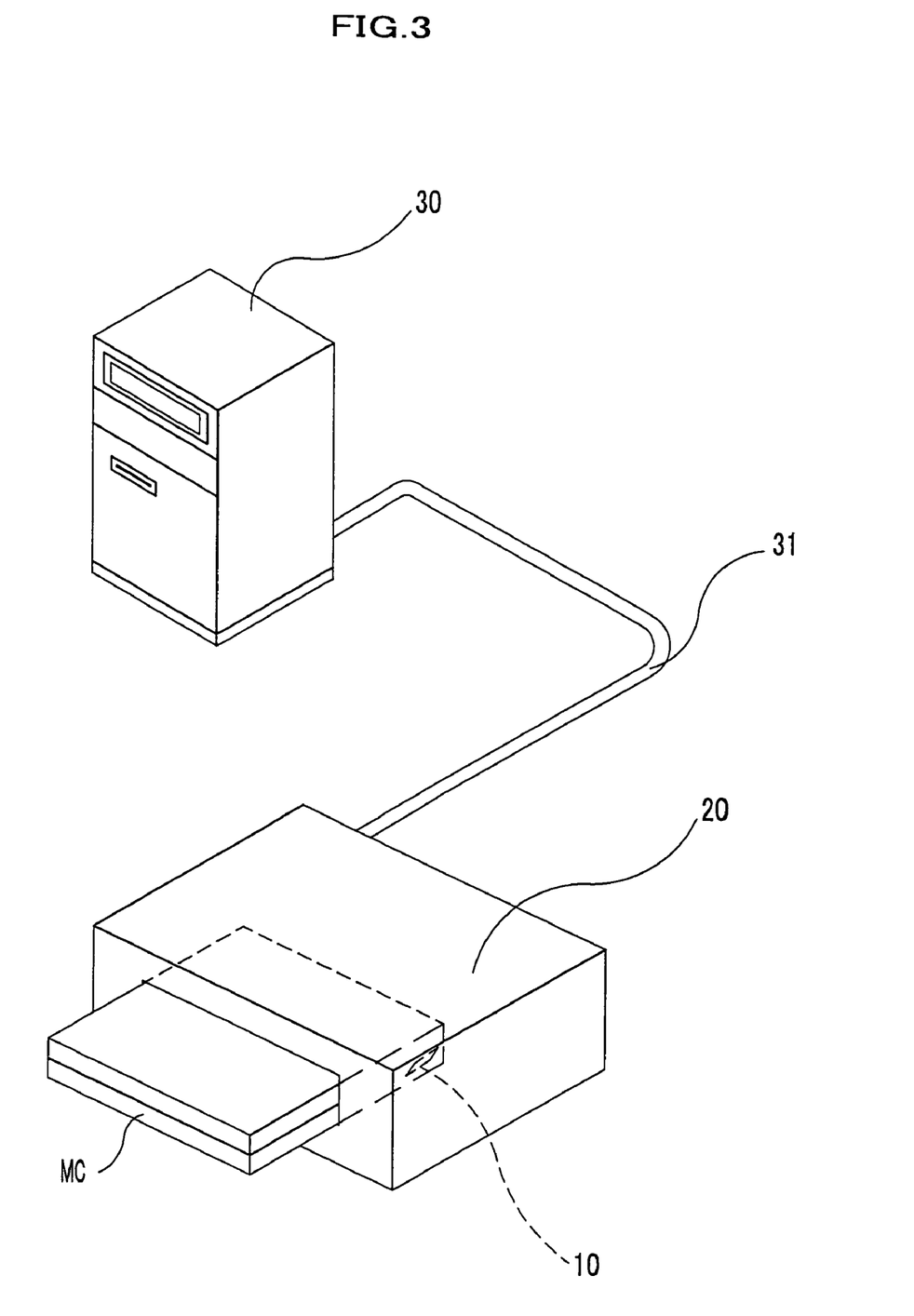
FIG. 3 is a perspective view showing a recording/reproducing apparatus 20 of a magnetic cartridge tape and an external computer 30 connected to the apparatus 20 related to the embodiment.
Figure 4:
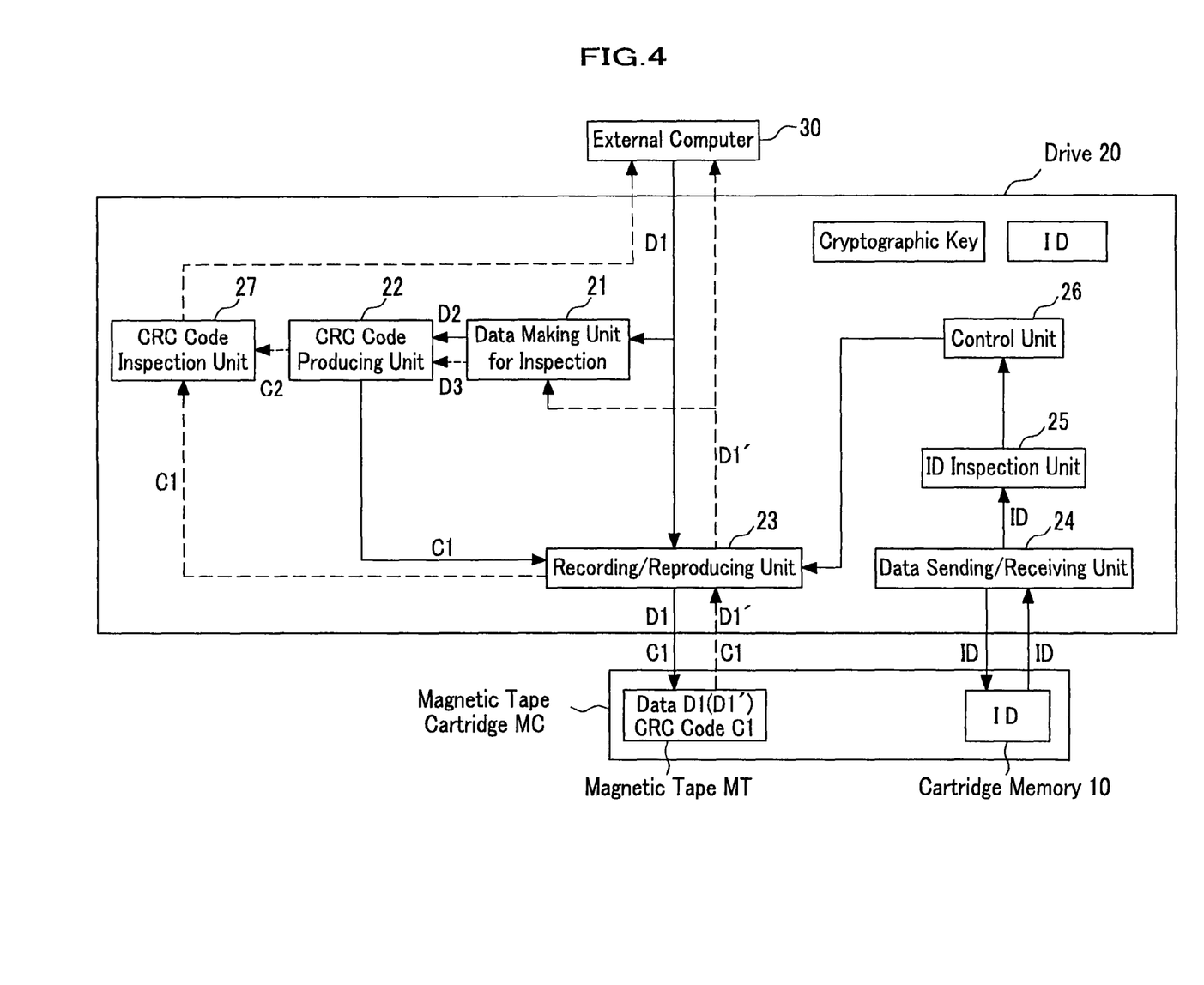
FIG. 4 is a block diagram schematically showing a configuration of the magnetic tape MC and apparatus 20 related to the embodiment.
Figure 5A:
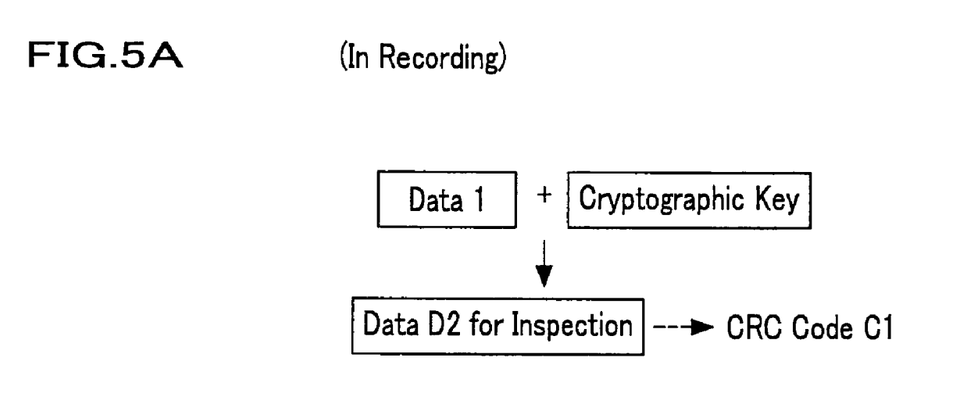
FIG. 5A is a drawing illustrating a first data D2 for inspection and a first CRC code C1 and FIG. 5B is a drawing illustrating a second data D2 for inspection and a second CRC code C2.
Figure 5B:
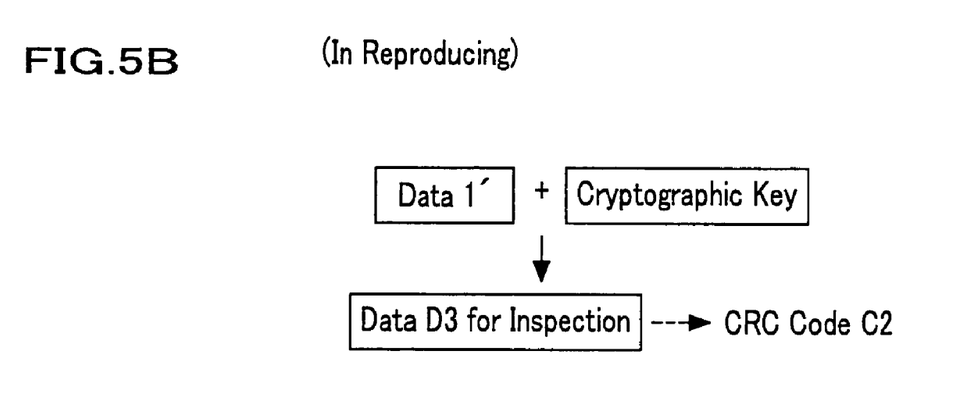

Then, a configuration of the apparatus related to the embodiment is described referring to FIGS. 3 to 5.

As shown in FIG. 3, the apparatus 20 is composed so as to be able to send/receive data to and from the external computer 30 by being connected to the computer 30 via a connecting cable 31. And as shown in FIG. 4, the apparatus 20 consists of an inspection data making unit 21, a CRC cord producing unit 22, a recording/reproducing unit 23, a data sending/receiving unit 24, an ID inspection unit 25, a control unit 26, and a CRC code inspection unit 27. Moreover, in the apparatus 20, its unique ID and key are stored. In the embodiment, as the unique key of the apparatus 20, a cryptographic key is used to encrypt or decrypt data.

The inspection data making unit 21, as shown in FIG. 5A, couples "input data D1" input through the computer 30 and the cryptographic key stored in the apparatus 20 when it records data in the magnetic tape MT of the magnetic tape cartridge MC (hereinafter referred to as "in recording"), thereby making a "first data D2 for inspection" which is used in the case of making a "first CRC cord C1" in the CRC code producing unit 22. The first data D2 for inspection made in the inspection data making unit 21 is output into the CRC code producing unit 22.

Moreover, the inspection data making unit 21, as shown in FIG. 5B, couples a data D1' reproduced in the recording/reproducing unit 23 and the cryptographic key stored in the apparatus 20 when it reproduces data in the magnetic tape MT of the magnetic tape cartridge MC (hereinafter referred to as "in reproducing"), thereby making a "second data D3 for inspection" which is used in the case of making a "second CRC cord C2" in the CRC code producing unit 22. The second data D3 for inspection made in the inspection data making unit 21 is output into the CRC code producing unit 22.

In recording, the CRC code producing unit 22 produces the "first CRC code C1" from the first data D2 for inspection input from the inspection data making unit 21 (see FIG. 5A). The first CRC code C1 produced in the CRC code producing unit 22 is output into the recording/reproducing unit 23.

Moreover in reproducing, the CRC code producing unit 22 produces the "first CRC code C1" from the second data D3 for inspection input from the inspection data making unit 21 (see FIG. 5B). The second CRC code C2 produced in the CRC code producing unit 22 is output into the CRC code inspection unit 27.

The recording/reproducing unit 23 is equipped with a magnetic head not shown in the drawings, and in recording, records the input data input from the computer 30 and the first CRC code C1 input from the CRC producing unit 22 into the magnetic tape MT of the magnetic tape cartridge MC. Then, after making the input data being encrypted by the cryptographic key, it can also be memorized in the magnetic tape MT.

Moreover in reproducing, the recording/reproducing unit 23 reproduces the data D1' recorded in the magnetic tape MT of the magnetic tape cartridge MC and the first CRC code C1. Then, data D1' reproduced. in the recording/reproducing unit 23 is output into the inspection data making unit 21. The first CRC code C1 reproduced in the recording/reproducing unit 23 is output into the CRC code inspection unit 27.

Although detail is described later, operations in recording/reproducing of the recording/reproducing unit 23 are controlled by the control unit 26.

The data sending/receiving unit 24 is equipped with an antenna not shown in the drawings, and data is sent/received to and from the cartridge memory 10 of the IC chip 10c by propagating electromagnetic waves from the antenna to the loop antenna 10b (see FIG. 2B) of cartridge memory 10 of the magnetic tape cartridge MC.

In recording, the data sending/receiving unit 24 reads out the usage history information of the magnetic tape cartridge MC recorded in the IC chip 10c of the cartridge memory 10 and searches the usage history of the magnetic tape cartridge MC in the apparatus 20. Only if there exists no usage history of the magnetic tape cartridge MC in the apparatus 20, its unique ID is recorded in the IC chip 10c of the cartridge memory 10. Then, the ID is recorded in an unrewritable condition, that is, a condition which cannot be rewritten afterward.

Moreover in recording/reproducing, the data sending/receiving unit 24 reads out an ID recorded in the IC chip 10c of the cartridge memory 10. The ID read out by the data sending/receiving unit 24, that is, the ID recorded in the IC chip 10c of the cartridge memory 10 is output into the ID inspection unit 25.

In recording/reproducing, the ID inspection unit 25 inspects whether or not the ID recorded in the IC chip 10c of the cartridge memory 10 and an ID stored in the apparatus 20 accord by comparing both. If both accord, a signal indicating it is output into the control unit 26. If not, a signal indicating it is output into the unit 26.

In recording/reproducing, the control unit 26 controls the operations of the recording/reproducing unit 23 based on an input signal (inspection result) from the ID inspection unit 25. Concretely, if a signal indicating that the ID recorded in the IC chip 10c of the cartridge memory 10 and an ID stored in the apparatus 20 accord is input from the ID inspection unit 25, the recording/reproducing unit 23 is made to operate as usual.

On the other hand, if a signal indicating that the ID recorded in the IC chip 10c of the cartridge memory 10 and an ID stored in the apparatus 20 do not accord is input from the ID inspection unit 25, the recording/reproducing unit 23 is made to stop the operations of the recording/reproducing unit 23. Then, the operations of the recording/reproducing unit 23 may be limited, for example, only to reproducing.

As described above, composing the control of operations of the recording/reproducing unit 23 so as to record/reproduce the magnetic tape MT only if an ID recorded in the cartridge memory 10 and an ID recorded in the apparatus accord enables the leakage of the data recorded in the magnetic tape MT to be prevented because the magnetic tape cartridge MC can be recorded/reproduced only by a specific recording/reproducing apparatus.

In reproducing, the CRC code inspection unit 27 inspects whether or not the first CRC code C1 input from the recording/reproducing unit 23 and the second CRC code C2 input from the CRC code producing unit 22 accord by comparing both. If both accord, the data D2 recorded in the magnetic tape MT is judged not to be tampered and a signal indicating it is output into the computer 30. If not, the data D2 is judged to be tampered and a signal indicating it is output into the computer 30.

As described above, by inspecting in the CRC code inspection unit 27 whether or not the first CRC code C1 input from the recording/reproducing unit 23 and the second CRC code C2 input from the CRC code producing unit 22 accord, the data D2 recorded in the magnetic tape MT can be known whether or not it is tampered. That is, the authenticity of the data D2 can be determined.

Figure 6:
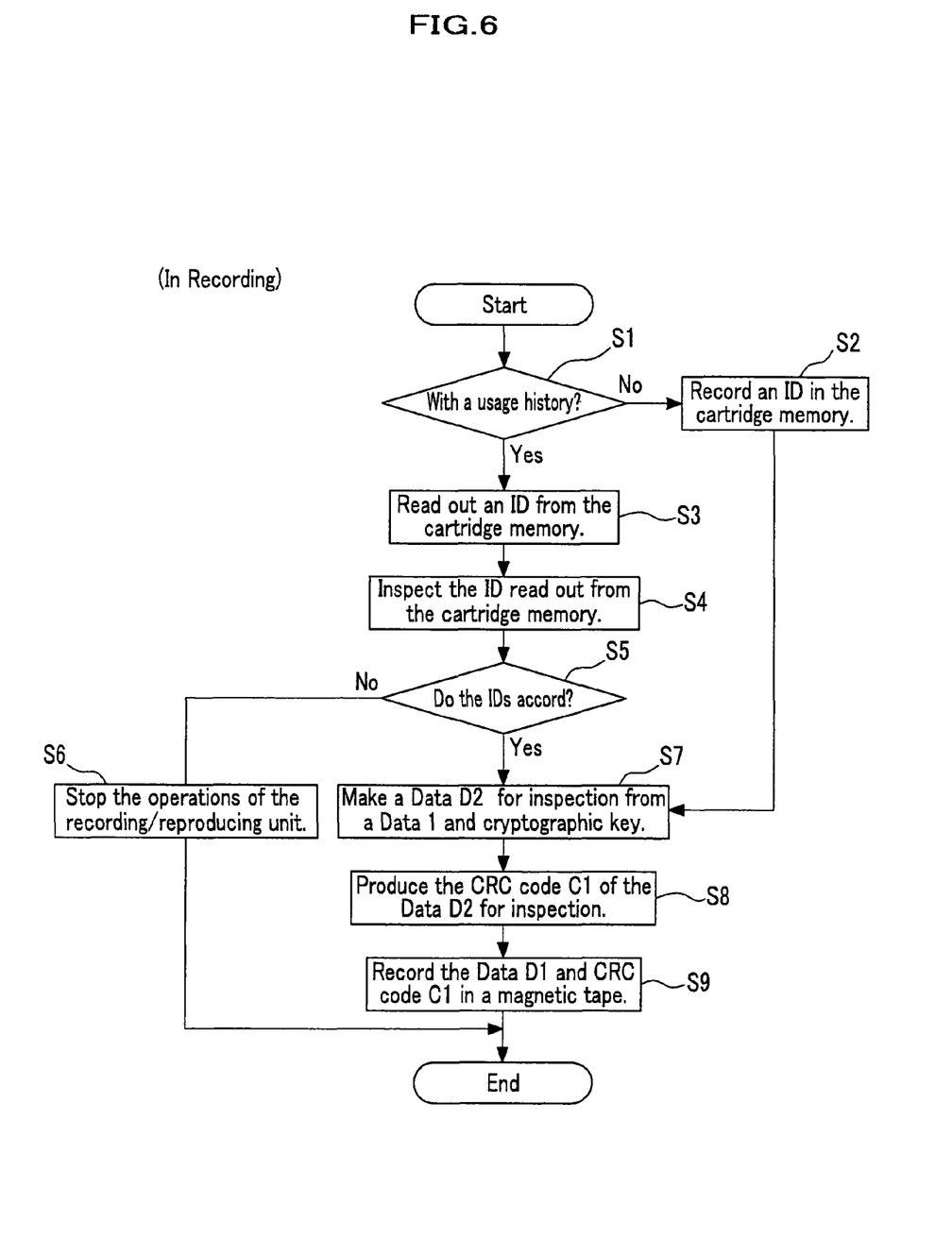
FIG. 6 is a flow chart showing operations of the apparatus 20 in recording.
Figure 7:
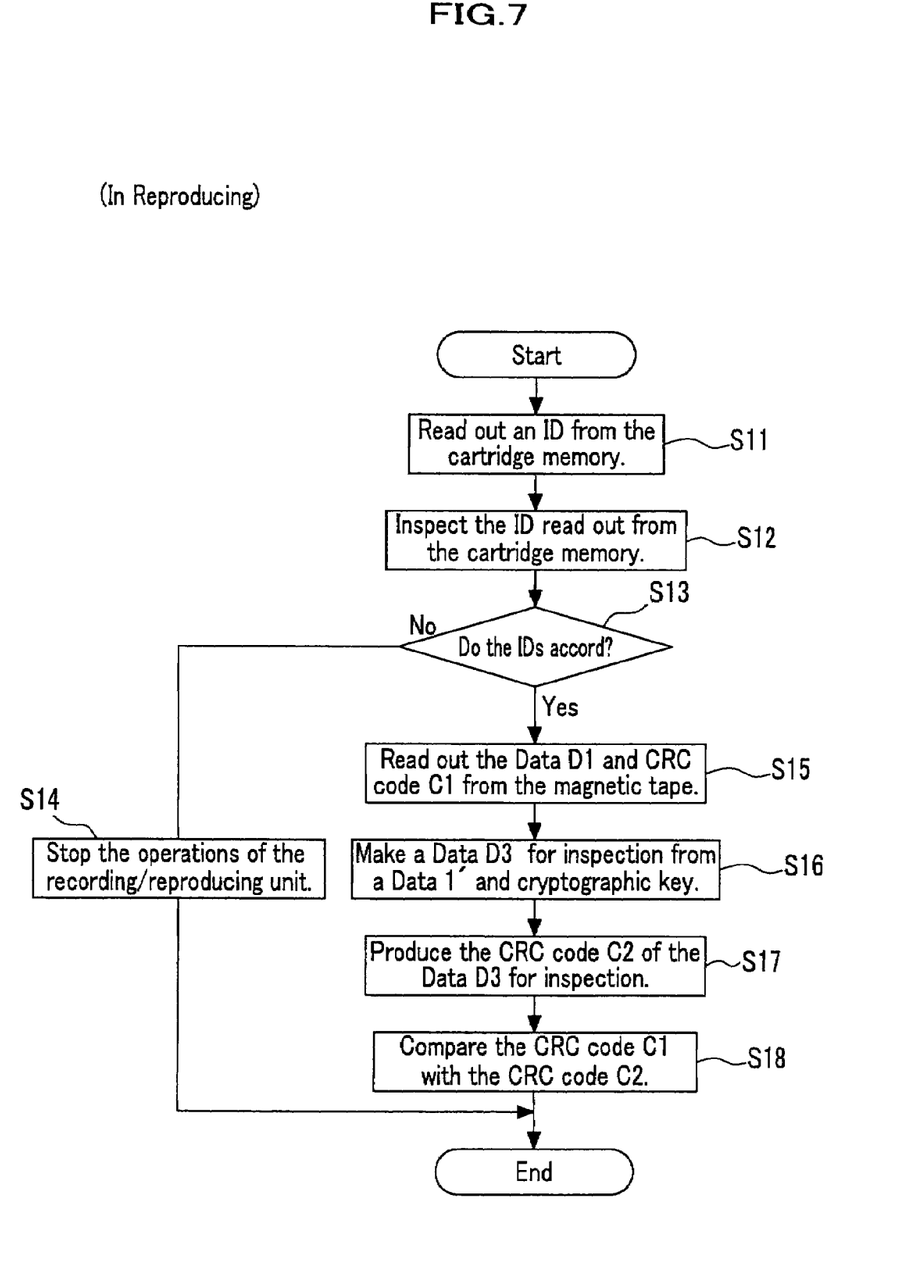
FIG. 7 is a flow chart showing operations of the apparatus 20 in reproducing.

Next, the operations of the apparatus composed as stated above are described referring to flow charts shown in FIGS. 6 and 7.

Firstly, the operations of the apparatus in recording are described referring to a flow chart shown in FIG. 6.

First, a step S1 reads out usage history information of the magnetic tape cartridge MC recorded in the IC chip 10c of the cartridge memory 10 by the data sending/receiving unit 24 and searches a usage history of the magnetic tape cartridge MC in the apparatus 20. Then, if there exists no usage history of it, proceed to a step S2, and if there exists its usage history, proceed to a step S3.

A step S2 records the unique ID of the apparatus 20 in the IC chips 10c of the cartridge memory 10 by the data sending/receiving unit 24. Then, the ID is recorded in an unrewritable condition afterward. After that, proceed to a step S7.

The step S3 reads out an ID recorded in the IC chips 10c of the cartridge memory 10 by the data sending/receiving unit 24. The read-out ID is output into the ID inspection unit 25.

A succeeding step 4 compares the ID recorded in the IC chips 10c of the cartridge memory 10 with an ID stored in the apparatus 20, thereby inspecting whether or not both accord. An inspection result is output into the control unit 26.

Then, a next step S5 controls the operations of the recording/reproducing unit 23 by the control unit 26 based on a signal (inspection result) input from the ID inspection unit 25. If a signal indicating that the ID recorded in the IC chip 10c of the cartridge memory 10 and an ID stored in the apparatus 20 do not accord is input, proceed to a step S6. On the contrary, if a signal indicating that the ID recorded in the IC chip 10c of the cartridge memory 10 and an ID stored in the apparatus 20 accord is input, operate the recording/reproducing unit as usual and proceed to a step S7.

The step S6 stops the operations of the recording/reproducing unit 23, thereby terminating all processes. Meanwhile, the operations of the recording/reproducing unit 23 may be limited, for example, only to reproducing.

The succeeding step S7 couples an input data D1 input through the computer 30 and the cryptographic key stored in the apparatus 20, thereby producing the first data D2 for inspection used in the case of making the first CRC code C1 in the CRC code producing unit 22 (see FIG. 5A). The first data D2 for inspection made in the inspection data unit 21 is output into the CRC code producing unit 22.

A next step S8 produces the first CRC code C1 from the first data D2 for inspection input from the inspection data making unit 21 by the CRC code producing unit 22 (see FIG. 5A). The first CRC code C1 produced in the CRC code producing unit 22 is output into the recording/reproducing unit 23.

Then, a next step S9 records the input data D1 input from the external computer 30 and the first CRC code C1 input from the CRC code producing unit 22 in the magnetic tape MT of the magnetic tape cartridge MC by the recording/reproducing unit 23, thereby terminating all processes.

Next, the operations of the apparatus 20 are described referring to a flowchart shown in FIG. 7.

First, a step S11 reads out the ID recorded in the IC chip 10c of the cartridge memory 10 by the data sending/receiving unit 24. The read-out ID is output into the ID inspection unit 25.

A succeeding step S12 compares the ID input from the data sending/receiving unit 24 with the ID stored in the apparatus 20 by the ID inspection unit 25 and inspects whether or not both accord. An inspection result is output into the control unit 26.

Then, a next step S13 controls the operations of the recording/reproducing unit 23 by the control unit 26 based on a signal (inspection result) input from the ID inspection unit 25. Concretely, if a signal indicating that the ID recorded in the IC chip 10c of the cartridge memory 10 and an ID stored in the apparatus 20 do not accord is input from the ID inspection unit 25, the recording/reproducing unit 23 is limited only to reproducing, thereby terminating all processes. On the contrary, if a signal indicating that the ID recorded in the IC chip 10c of the cartridge memory 10 and an ID stored in the apparatus 20 accord is input, operate the recording/reproducing unit 23 as usual and proceed to a next step S15.

A step S14 stops the operations of the recording/reproducing unit 23, thereby terminating all processes. Meanwhile, the operations of the recording/reproducing unit 23 may be limited, for example, only to reproducing.

The step S15 reproduces the data D1' recorded in the magnetic tape MT of the magnetic tape cartridge MC and the first CRC code C1 by the recording/reproducing unit 23. Here, the data D1' reproduced in the recording/reproducing unit 23 is output into the inspection data making unit 21. The first CRC code C1 reproduced in the recording/reproducing unit 23 is output into the CRC code inspection unit 27.

A step S16 couples the data D1 input from the recording/reproducing unit 23 and the cryptographic key stored in the apparatus 20 by the inspection data producing unit 21, thereby making the second data D2 for inspection (see FIG. 5B). It is output into the CRC code producing unit 22.

A next step S17 produces the second CRC code C2 from the second data for inspection input from the inspection data producing unit 21 (see FIG. 5B). The second CRC code C2 produced in the CRC code producing unit 22 is output into the CRC code inspection unit 27.

A step S18 compares the first CRC code C1 input from the recording/reproducing unit 23 with the second CRC code C2 input from the CRC code producing unit, thereby inspecting whether or not both accord. If both accord, the data D2 recorded in the magnetic tape MT is judged not to be tampered and a signal indicating it is output into the computer 30. On the other hand, if not, the data D2 is judged to be tampered and a signal indicating it is output into the computer 30, thereby terminating all processes.

Although the embodiment of the invention is described as above, the invention is not limited to such the embodiment and is available for various variations as far as embodiments are based on the technical ideas of the invention.

For example, it is also possible to compose so as to output an inspection result in the CRC code inspection unit 27 into the control unit 26, to make the recording/reproducing unit 23 operate as usual only in case of the accordance of the first CRC code C1 and second CRC code C2, and to make the operations of the recording/reproducing unit 23 stop in case of no accordance of the first CRC code C1 and second CRC code C2 by the control unit 26. Such a composition enables the leakage of data recorded in the magnetic tape MT to be prevented because the magnetic tape MT can be recorded/reproduced only by the specific recording/reproducing apparatus.

The apparatus can also be composed so as to determine a data array (interleave) recorded in the magnetic tape MT based on the cryptographic key. Such the composition enables only the specific recording/reproducing apparatus to record/reproduce the magnetic tape MT with the cryptographic key because data recorded in the magnetic tape MT can be decrypted without the cryptographic key. Thus, the leakage of the data recorded in the magnetic tape MT can be more surely prevented.

Although a case is assumed in the embodiment that a magnetic tape is applied as a recording medium, an optical recording tape is also applicable not limited to a magnetic tape. Moreover, not limited to a tape, a disk is also applicable as the recording medium.

What is claimed is:

1. A recording/reproducing apparatus for recording/reproducing a recording medium cartridge, the apparatus comprising:
a Cyclic Redundancy Check (CRC) code producing unit which when recording, produces a first CRC code from first data for inspection made by coupling input data input from outside and a recording/reproducing apparatus unique key stored in said apparatus, and when reproducing, produces a second CRC code made from second data for inspection by coupling data read out from a recording medium and the unique key;
a recording/reproducing unit which when recording, writes said input data and first CRC code in said recording medium and when reproducing, reads out data recorded in said recording medium and said first CRC code; and
a CRC code inspection unit which when reproducing, compares said first CRC code with said second CRC code, thereby inspecting whether or not both codes accord,
wherein data authenticity recorded in said recording medium is determined based on an inspection result of said CRC code inspection unit.

2. A recording/reproducing apparatus according to claim 1, wherein only when said first CRC code and second CRC code accord, said recording medium cartridge is recorded/reproduced.

3. A recording/reproducing apparatus according to claim 2, wherein a data array recorded in said recording medium is determined based on said key.

4. A recording/reproducing apparatus according to claim 3, wherein said recording medium is a magnetic tape.

5. A recording/reproducing apparatus according to claim 3, wherein said recording medium is a magnetic disk.

6. A recording/reproducing apparatus according to claim 3, wherein said recording medium is an optical tape.

7. A recording/reproducing apparatus according to claim 3, wherein said recording medium is an optical disk.

8. A recording/reproducing apparatus according to claim 2, wherein said recording medium is a magnetic tape.

9. A recording/reproducing apparatus according to claim 2, wherein said recording medium is a magnetic disk.

10. A recording/reproducing apparatus according to claim 2, wherein said recording medium is an optical tape.

11. A recording/reproducing apparatus according to claim 2, wherein said recording medium is an optical disk.

12. A recording/reproducing apparatus according to claim 1, wherein a data array recorded in said recording medium is determined based on said key.

13. A recording/reproducing apparatus according to claim 1, wherein said recording medium is a magnetic tape.

14. A recording/reproducing apparatus according to claim 1, wherein said recording medium is a magnetic disk.

15. A recording/reproducing apparatus according to claim 1, wherein said recording medium is an optical tape.

16. A recording/reproducing apparatus according to claim 1, wherein said recording medium is an optical disk.

* * * * *